Feb. 17, 1931.  C. PLEAS  1,793,290
SERRATED EDGED HOE
Filed Feb. 9, 1929
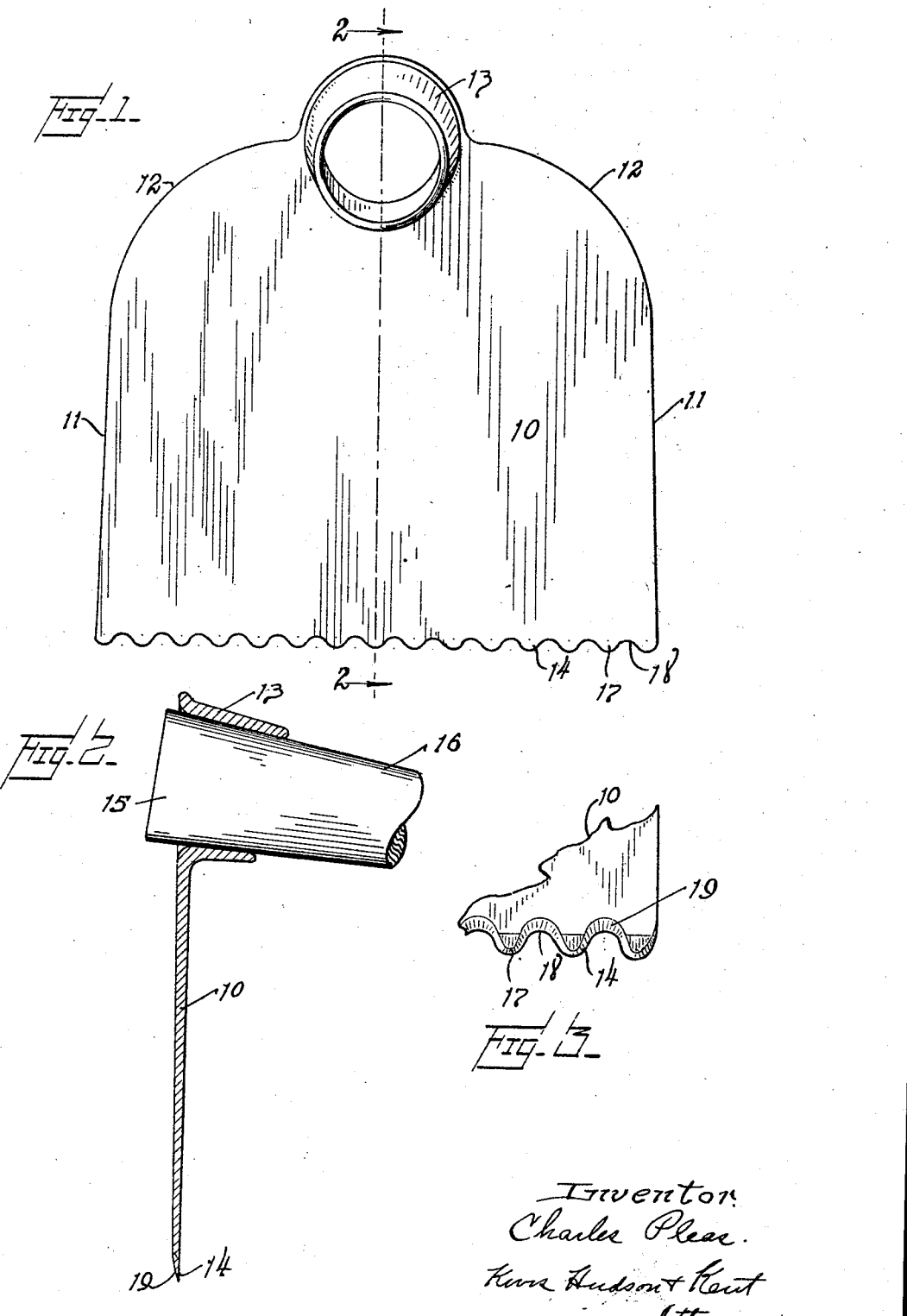

Patented Feb. 17, 1931

1,793,290

UNITED STATES PATENT OFFICE

CHARLES PLEAS, OF EAGLE LAKE, FLORIDA

SERRATED EDGED HOE

Application filed February 9, 1929. Serial No. 338,699.

This invention relates to implements, and more particularly to that form of implement which is commonly known as a hoe.

In general the function of a hoe is twofold, first, to cut and destroy obnoxious weeds; second, to dig up or loosen the earth near the stalks of growing vegetation. As is well known, in general use a hoe encounters various kinds of soil and varying soil conditions, for example in hot dry weather certain soils acquire a hard crusted surface which can be penetrated or broken by a straight-edged hoe only by expending a great deal of energy. When a stroke is made on such crusted or packed soil with a straight-edged hoe the tendency is for the hoe to slide over the surface without penetrating the soil, and it is frequently necessary to tilt an ordinary hoe so that the soil may be penetrated by a corner of the hoe.

It is an object of this invention to provide an improved form of hoe which will perform its functions and produce the desired results with the expenditure of a minimum amount of energy.

Another object of this invention is to provide a hoe having a serrated edge.

Other objects and advantages of this invention will be apparent from the following description taken in connection with the accompanying drawings of which Figure 1 is an elevational view of the device.

Fig. 2 is a sectional view taken on line 2—2 of Fig. 1; and

Fig. 3 is a fragmentary detail view showing a portion of the cutting edge.

Referring now to the drawings, which show the details of construction of my improved form of hoe, I provide the plate 10, which is of suitable material such as a steel forging. The plate 10 is shaped to provide the usual straight converging edges 11 and the rounded portions 12, which give the hoe a neat appearance and a proper balance. To provide a simple and rugged form of handle connection, which can be easily manufactured, I prefer to make this connection in the form of a ferrule 13 which is formed integral with the plate 10. As shown in the drawings, the ferrule 13 is formed at the mid point of one edge of the plate 10, opposite the cutting edge 14, and between the rounded portions 12. The ferrule 13 is positioned with its axis inclined to the plane of the plate 10, and has tapered walls which engage the enlarged portion 15 of a handle 16 to hold the hoe on the handle. This form of connection possesses the further advantage that a broken handle can be easily and cheaply replaced.

The cutting edge 14 is of serrated form comprising a series of tooth-like projections 17 which alternate with indentations 18. The edge 14 is tapered as indicated at 19 to provide the projections 17 and the indentations 18 with a sharp cutting edge.

In using my improved form of hoe the points of the projections 17 first make contact with the resisting surface, which may be that of the soil or of vegetation. The effort applied to the hoe through the handle 16 is concentrated at these points which consequently penetrate the surface. Once the surface is broken by the projections 17, the entire cutting edge will penetrate the surface with slight effort.

My improved form of cutting edge has the further advantage that it will remain sharp during a long period of usage because the points of projections 17 shield the remaining portions of the cutting edge by deflecting away small stones, and by preventing the remaining portions from contacting with the surfaces of hard bodies.

While I have shown and described a preferred embodiment of my invention it will be understood that I do not limit my invention to the precise construction shown and described, but regard my invention as including such forms as fall within the scope of the appened claims.

Having described my invention, I claim:

1. A hoe having an edge comprising a series of alternate projections and indentations, said projections and indentations being tapered on one side to a cutting edge, said projections being further beveled on the same side but to a different angle from that of the indentations.

2. A hoe having an undulatory cutting edge comprising rounded projections and rounded indentations, said rounded projections being sharpened to a less degree than the rounded indentations.

In testimony whereof, I hereunto affix my signature.

CHARLES PLEAS.